United States Patent Office 3,306,939
Patented Feb. 28, 1967

3,306,939
ORTHOESTERS OF 2,2,2-TRINITROETHANOL
Marion E. Hill, Kensington, Md., assignor to the United States of America as represented by the Secretary of the Navy
No Drawing. Filed Dec. 5, 1956, Ser. No. 626,549
9 Claims. (Cl. 260—644)

The invention described herein may be manufactured and used by or for the Government of the United States of America for governmental purposes without the payment of any royalties thereon or therefor.

This invention relates to a process for the production of highly nitrated organic compounds. More particularly this invention relates to a new and useful process for the preparation of orthoesters of 2,2,2-trinitroethanol and to new and useful orthoesters prepared by this process.

Highly nitrated organic compounds have been found useful as high explosives because of their high nitrogen and oxygen content. Of particular interest are compounds derived from 2,2,2-trinitroethanol which form an entirely new class of explosive compounds.

It has long been known that orthoesters of alcohols such as methanol and ethanol could be prepared by one of several general reactions. These esters can be obtained from the hydrochlorides of the imilo-ethers by interaction with alcohol.

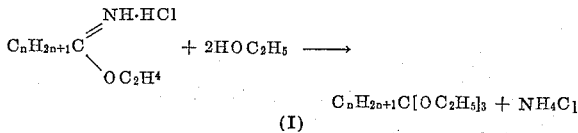

(I)

They are also prepared from chloroform and other trihalogen compounds by the action of sodium alcoholates $$CHCl_3 + 3NaOC_2H_5 \rightarrow CH[OC_2H_5]_3 + NaCl$$

(II)

or $$NO_2CCl_3 + 4NaOC_2H_5 \rightarrow C[OC_2H_5]_4 + NaONO + 3NaCl$$

(III)

These reactions have ben found to apply generally to compounds of the aliphatic, aromatic or heterocyclic type. However, these reactions have been found to be unsuitable for the preparation of orthoesters of 2,2,2-trinitroethanol. Under the basic conditions of reactions II and III the 2,2,2-trinitroethanol is decomposed. For reaction I the starting material is prepared by the reaction of a nitrite with an alcohol using hydrogen chloride as catalyst. The chemical unreactivity of polynitroalcohols such as 2,2,2-trinitroethanol makes the preparation of such a corollary compound next to impossible. Thus orthoesters of polynitroalcohols such as 2,2,2-trinitroethanol cannot feasibly be prepared by any of reactions I, II, or III.

By the process of my invention orthoesters may be prepared by the reaction of polynitroalcohols and polyhalogen compounds in the presence of ferric chloride. In this reaction the halogens are removed as hydrogen halide and replaced by the polynitroalkyl group. This reaction has been successfully employed to prepare stable new high explosive compounds. It is, therefore, an object of the present invention to provide a new and useful process for the preparation of orthoesters of polynitroalcohols.

Another object is to provide new and useful orthoesters of polynitroalcohols.

A further object is to provide a process for the preparation of new and useful stable high explosive compounds.

A still further object is to provide a catalyst for the preparation of orthoesters by the reaction of polynitroalcohols with polyhalogen compounds.

Other objects and the attendant advantages of the invention will become apparent to those skilled in the art as the invention is disclosed in the following detailed description.

The orthoesters are prepared according to the process of the invention by simply refluxing for several hours a solution of the dry polynitroalcohol with the polyhalogen compound in the presence of a catalytic amount of anhydrous ferric chloride. By-products of the reaction are evolved steadily during the reaction period and the product forms within 1–2 hours and is precipated nearly quantitatively from the reaction mixture.

For best results strictly anhydrous ferric chloride should be employed as the presence of moisture tends to increase the amount of by-products formed. Very little difference in yield is obtained by increasing the amount of the catalyst and the catalyst does not appear to undergo a change during the reaction.

Polyhalogen compounds such as carbon tetrachloride, chloroform, benzotrichloride, dibromodichloromethane and the like are suitable for use in the reaction. A highly concentrated reaction solution has been found to be desirable. The formation of products using chloroform proceeds much more slowly than does the reaction with carbon tetrachloride. A prolonged reflux period is required with the chloroform before a good yield will be obtained although the reaction temperature is lower. When benzotrichloride is used an excess of the polynitroalcohol must be reacted and smaller yields are obtained. Ordinarily the carbon tetrachloride or chloroform would be in excess.

The mechanism of the orthoester formation is not apparent. However, it appears that the ferric chloride forms a complex with the halogen compound

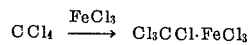

This complex gives the central carbon a positive character

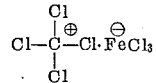

One result of such a complexing action is to force the atoms of the CCl$_3$ moiety towards co-planarity. Given such a condition of co-planarity and the carbonium ion character of the carbon atom then the polynitroalcohol which is basic relative to that carbon atom and nucleophilic could easily approach the carbon atom, form a partial bond and split out hydrogen chloride.

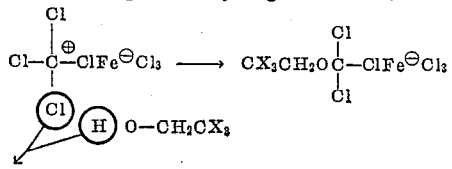

The result would be an intermediate of more reactive character because of a stabilization of the carbonium ion character of the central carbon by the trinitroethoxy oxygen atom. Thus a faster reaction than before would ensue accounting for the subsequent substitutions and final regeneration of the ferric chloride. The following general equation could represent the complete reaction.

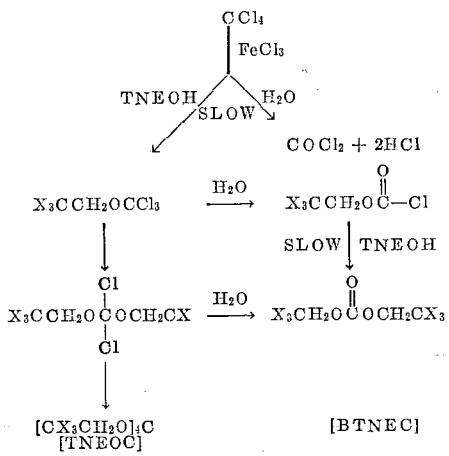

X stands for NO₂ group
TNEOH—2,2,2-trinitroethanol
TNEOC—2,2,2-trinitroethyl orthocarbonate
BTNEC—bis trinitroethyl carbonate The formation of BTNEC, bis(trinitroethyl)carbonate, can be accounted for by the hydrolytic action of small amounts of water on the intermediates postulated above. The amount of BTNEC, bis (trinitroethyl) carbonate, formed in strictly anhydrous systems is virtually nil while on the other hand, BTNEC, bis (trititroethyl) carbonate, could be obtained as the principal product with no orthoester formation when water is deliberately added.

The following examples are given by way of illustration and are not to be considered as limiting the invention in any manner.

EXAMPLE I 2,2,2-trinitroethanol (4.34 g., 24 mmol.) and 0.40 g. (10 wt. percent) of ferric chloride were placed in 10 cc. of carbon tetrachloride with careful exclusion of moisture. The mixture was refluxed for 24 hours. Upon cooling, the carbon tetrachloride solution was decanted from the crystalline product and ferric chloride. Evaporation of the mother liquor left only a very small amount of an oil. The crystalline product and ferric chloride were freed of solvent in vacuo and then slowly added to an iced dilute hydrochloric acid solution to dissolve the ferric chloride. Filtration and drying gave 3.67 g. of crude product. By recrystallization of the crude material from chloroform (35 cc. per gm.), 3.50 g. (80 mole percent) of trinitroethyl orthocarbonate, M.P. 161.5–162° C., was obtained in two crops. An additional 0.07 g. of a mixture M.P. 107–110° C. of bis(trinitroethyl)carbonate and trinitroethyl orthocarbonate was isolated.

The process was repeated with varying experimental conditions. The formation of the trinitroethyl orthocarbonate was found to be very sensitive to the conditions of the reaction. If the reaction solution was more dilute than 1.6 millimoles per cubic centimeter the yield of the product was decreased and a higher percentage of uncrystallizable oils was obtained. These oils contained partially substituted intermediates. By keeping the reaction period between 16–24 hours the formation of the by-product bis (trinitroethyl) carbonate was minimized. The ferric chloride was found to be definitely catalytic in action. Very little difference in yield was obtained when 4, 10, 25 or 50 mole percent of the catalyst was used. Some of the catalyst in each case was essentially deactivated by being completely enclosed by product crystals. The catalyst maintained its original appearance throughout the reaction. Several attempts to find any reduced ferrous chloride failed. The presence of moisture in any of the components of the system increased the proportion of BTNEC, bis (trinitroethyl) carbonate which was formed. However the ferric chloride would dry itself by hydrolysis of the carbon tetrachloride to phosgene and hydrogen chloride which were evolved as by-products all during the reaction period.

The physical properties of the trinitroethyl orthocarbonate were determined and are given in the following table.

TABLE I

*Properties of TNEOC (trinitroethyl orthocarbonate)*

Molecular wt. _____ 732.
Melting pt. _____ 163° C. dec.
Vacuum stability _____ 0.85 cc. of gas/g. in 6 days at 100° C.
Impact stability _____ 7 cm.
Crystal density _____ 1.84.
Oxygen content _____ 61.49% (=1.1 g. of $O_2$ per cc.).
Solubility _____ Insol. in $H_2O$. Very slightly soluble in $CCl_4$ or hexane. Soluble in methanol, chloroform or ether.

EXAMPLE II

With careful exclusion of moisture 9.20 g. (51 mmol.) of 2,2,2-trinitroethanol and 2.0 g. (21 wt. percent) of ferric chloride were added to 20 cc. of chloroform. The formation of the product proceeded much more slowly than did the reaction with carbon tetrachloride. A good yield was not obtained until a particularly prolonged reflux period was used. The mixture was refluxed for 120 hours. Upon cooling the contents of the reaction vessel were poured into 200 cc. of ether. The ether solution was extracted several times with water and dried. Removal of the solvent by distillation under vacuum left a crude product which was recrystallized from a 50% mixture of chloroform and hexane. There was obtained 6.92 g. (74%) of trinitroethyl orthoformate M.P. 127.6–128° C. Elemental analysis of the compound gave values of C, H and N very close to the theoretical for TNEOF (2,2,2-trinitroethyl orthoformate). Table II summarizes the physical properties of the compound.

TABLE II

*Properties of TNEOF (2,2,2 trinitroethyl orthoformate)*

Melting point _____ 127.6–128° C.
Impact sensitivity _____ 7 cm.
Vacuum stability _____ 0.50 cc. of gas/g. after 48 hours at 100° C.
Crystal density _____ 1.80.
Solubility _____ Soluble in methanol, chloroform, carbon tetrachloride. Insoluble in water, hexane.

As with the 2,2,2-trinitroethyl orthocarbonate preparation a highly concentrated reaction solution was desirable. Unlike the orthocarbonate preparation no by-products were found.

EXAMPLE III

To a solution of 1.38 g. (0.007 mole) of benzotrichloride and 4.52 g. (0.025 mole) of 2,2,2-trinitroethanol in 25 ml. of tetrachloroethylene was added 0.90 g. (.0055 mole) of dry ferric chloride at room temperature. The mixture was brought to 60° C. and held for 5 hours. The mixture was then heated to 90° C. and held for 16 hours. After cooling the entire mixture was poured into ether and then extracted with water, sodium bicarbonate solution several times and then with water again. The ether solution was dried and evaporated in vacuo. The residual oil crystallized upon standing. Recrystallization of the crude oil gave 0.71 g. of trinitroethyl orthobenzoate.

The physical properties of the trinitroethyl orthobenzoate were determined and are given in the following Table III.

TABLE III

*Properties of trinitroethyl orthobenzoate*

| | |
|---|---|
| Melting point | 115.5–116° C. |
| Impact sensitivity | 16 cm. |
| Vacuum stability | 0.40 cc. of gas/g. after 5 days at 100° C. |
| Crystal density | 1.62. |

EXAMPLE IV

At room temperature 5 ml. of dibromodichloromethane, 1.81 g. (0.010 mole) of 2,2,2-trintroethanol and 0.36 g. (0.002 mole) of ferric chloride were mixed. The mixture was gradually warmed to 75° C. and held at that temperature until gas evolution was substantially nil (about 5 hours). After cooling the reaction mixture was carefully added to cold ether. The insoluble inorganic material was filtered off and the ether filtrate was extracted with water. After drying and exaporaton of the ether, the product was recrystallized from chloroform and hexane. There was obtained 0.87 g. of trinitroethyl orthocarbonate mixed with a small amount of bis (trinitroethyl) carbonate by-product.

In the process of the invention the polyhalogen compound is ordinarily in excess. However, it has been found that where benzotrichloride is in excess only one chlorine atom is substituted and the other two are hydrolyzed in the workup. Consequently in the preparation of the trinitroethyl orthobenzoate it is necessary to run the reaction with the 2,2,2-trinitroethanol in excess. As neither tetrachloroethylene nor tetrachloroethane undergo reacton with trinitroethanol in the presence of ferric chloride on prolonged heating at 90–100° C. for 24 hours. They are useful as solvents where the trinitroethanol must be employed in excess.

The 2,2,2-trinitroethanol will react according to the process of the invention with organic compounds containing a terminal trihalogen substituted methyl group. Best results have been obtained using carbon tetrachloride. However, chloroform, benzotrichloride and dichlorodibromo methane have also been employed with success.

The new compounds prepared by the process of the invention are useful as stable, oxygen rich substitutes for RDX (cyclotrimethylenetrinitramine) and tetryl in the base charge of electric detonators. The orthoesters prepared as described above are mixed with aluminum powder and these mixtures are as sensitive to shock initiation as lead azide or mercury fulminate yet exceed RDX (cyclotrimethylenetrinitramine) in output. This makes possible the use of a smaller base charge in detonators of miniaturized design such as in small caliber fuzes and proximity fuzes. As only one to three grams are required per fuze the cost is almost insignificant. Typical formulations such as 73 percent trinitroethyl orthocarbonate and 27 percent of aluminum powder or, 74 percent trinitroethyl orthoformate and 26 percent aluminum powder or 75 percent trinitroethyl orthobenzoate and 25 percent aluminum are employed. They require no intermediate charge being readily initiated by any good primary mix. These orthoesters are also used as military high explosives either alone with a small amount (5%) of wax desensitizer or in mixtures with TNT e.g. 70/30. The usual detonated devices used in explosive technology will explode these high explosive compounds and their mixtures. Because of their high oxygen content these orthoesters are also used to replace the oxidants such as $KClO_4$ and $Ba(NO_3)_2$ as well as the sensitive explosive such as RDX in multicomponent priming mixtures thus cutting down the number of components as well as decreasing the amount of mixing necessary in the preparation of such mixtures.

The orthoesters of the invention may be cast loaded into containers or explosive devices much the same manner as TNT. These compounds are stable and reasonably safe in the molten state so they may be poured into a space in an explosive device and allowed to solidify. This technique is well known to those skilled in the art and is described in Department of the Army Technical Manual TM9–1910 entitled "Military Explosives" dated April 1955. The walls of the container or explosive device to be filled are pre-heated to the casting temperature. When the explosive, such as TNEOF (2,2,2-trinitroethyl orthoformate), previously melted by any appropriate means, such as in a steam heated container, is poured into the space to be filled. The filled container or explosive device is allowed to cool slowly by standing until room temperature is reached. A well is then drilled into the explosive charge using a water flushed drill in the manner well known to those skilled in the art. A detonator is then fitted into the well and upon proper detonation of the detonator by well known techniques the explosive charge will explode with great violence. These explosives may thus be used in all types of explosive devices both military and non-military. The use of such explosive charges as described above to destroy old buildings, split rocks, blast old trees and stumps etc. is well known in the art. Other methods of loading are also known, such as pressing, which may be employed in preparing these compounds for use and the above illustration should not be construed as limiting the invention in any manner.

What is claimed as new and desired to be secured by Letters Patent of the United States is:

1. An orthoester of 2,2,2-trinitroethanol selected from the group consisting of trinitroethyl orthocarbonate, trinitroethyl orthoformate, and trinitroethyl orthobenzoate.

2. A new chemical compound trinitroethyl orthocarbonate.

3. A new chemical compound trinitroethyl orthoformate.

4. A new chemical compound trinitroethyl orthobenzoate.

5. The process for preparing orthoesters of 2,2,2-trinitroethanol comprising reacting the 2,2,2-trinitroethanol in the presence of ferric chloride with a compound taken from a group consisting of carbon tetrachloride, chloroform and benzotrichloride.

6. The method of preparing trinitroethyl orthocarbonate comprising reacting 2,2,2-trinitroethanol with carbon tetrachloride in the presence of ferric chloride.

7. The method of preparing trinitroethyl orthoformate comprising reacting 2,2,2-trinitroethanol with chloroform in the presence of ferric chloride.

8. The method of preparing trinitroethyl orthobenzoate comprising reacting 2,2,2-trinitroethanol with benzotrichloride in the presence of ferric chloride.

9. The process of preparing orthoesters of 2,2,2-trinitroethanol comprising refluxing a mixture comprising 2,2,2-trinitroethanol, ferric chloride and a compound selected from a group consisting of carbon tetrachloride, chloroform and benzotrichloride.

References Cited by the Examiner

UNITED STATES PATENTS

| | | | |
|---|---|---|---|
| 3,103,882 | 9/1963 | Gilliland | 149—88 X |
| 3,160,654 | 12/1964 | Conly | 149—88 X |

CARL D. QUARFORTH, *Primary Examiner.*

WILLIAM WILES, ROGER L. CAMPBELL, *Examiners.*

L. A. SEBASTIAN, *Assistant Examiner.*